US010137925B2

(12) United States Patent
Appleyard (10) Patent No.: US 10,137,925 B2
(45) Date of Patent: Nov. 27, 2018

(54) IMPROVEMENTS TO STEERING COLUMN ASSEMBLIES (71) Applicant: TRW Limited, West Midlands (GB)

(72) Inventor: Michael Appleyard, Gloucestershire (GB)

(73) Assignee: TRW Limited, Solihull, West Midlands (GB)

( * ) Notice: Subject to any disclaimer, the term of this patent is extended or adjusted under 35 U.S.C. 154(b) by 136 days.

(21) Appl. No.: 15/512,363

(22) PCT Filed: Sep. 18, 2015

(86) PCT No.: PCT/GB2015/052708
§ 371 (c)(1),
(2) Date: Mar. 17, 2017

(87) PCT Pub. No.: WO2016/042342
PCT Pub. Date: Mar. 24, 2016

(65) Prior Publication Data
US 2018/0229756 A1 Aug. 16, 2018

(30) Foreign Application Priority Data

Sep. 19, 2014 (GB) .................................. 1416575.7

(51) Int. Cl.
*B62D 1/185* (2006.01)
*F16C 3/035* (2006.01)
(Continued)

(52) U.S. Cl.
CPC .............. *B62D 1/185* (2013.01); *F16C 3/035* (2013.01); *F16C 25/083* (2013.01); *F16C 33/60* (2013.01); *F16C 2326/24* (2013.01)

(58) Field of Classification Search
CPC .......... B62D 1/185; F16C 33/60; F16C 3/035; F16C 25/083; F16C 2326/24
See application file for complete search history.

(56) References Cited

U.S. PATENT DOCUMENTS 3,883,194 A * 5/1975 Pitner ................... F16C 19/466
384/582
4,820,062 A * 4/1989 Shirane ................. F16C 19/466
384/486

(Continued)

FOREIGN PATENT DOCUMENTS

DE 3808271 C1 10/1989
EP 1167790 A1 1/2002

(Continued)

OTHER PUBLICATIONS

Patents Act 1977: Search Report under Section 17(5), Application No. GB1416575.7, dated Mar. 13, 2015.

(Continued)

*Primary Examiner* — Darlene P Condra
(74) *Attorney, Agent, or Firm* — MacMillan, Sobanski & Todd, LLC (57) ABSTRACT A telescopic steering column assembly includes at least one support bearing assembly that comprises an inner bearing race which is located on the steering shaft, an outer bearing race that is located on an inner face of a shroud, and a set of ball bearings that are located between the inner bearing race and the outer bearing race and are free to roll along bearing surfaces defined by the bearing races. Each of the bearing races comprises a pair of annular bearing race parts, defining a circumferentially extending bearing surface arranged coaxially and spaced apart from each other axially such that varying the spacing between the two parts varies the effective radius of the bearing race. The support bearing assembly further comprising an inner annular support sleeve that is located between the inner bearing race and the inner shaft, an outer annular support sleeve that is located between the outer bearing race and the shroud, and a biasing means that in use applies an axially directed thrust between a first one of the annular support sleeves and one of the respective (Continued)

bearing race parts, and the bearing assembly is arranged such that the axial thrust applied by the biasing means is converted into a radial thrust that is applied to the inner bearing race and outer bearing race to force them into engagement with the inner and outer sleeves respectively.

12 Claims, 4 Drawing Sheets (51) Int. Cl.
*F16C 25/08* (2006.01)
*F16C 33/60* (2006.01)

(56) References Cited

U.S. PATENT DOCUMENTS

| | | | | |
|---|---|---|---|---|
| 5,316,393 | A * | 5/1994 | Daugherty | F16C 25/083 384/517 |
| 5,632,562 | A * | 5/1997 | Kidzun | B62D 1/16 384/536 |
| 6,474,875 | B1 * | 11/2002 | Waseda | B62D 1/16 384/536 |
| 2006/0039747 | A1 * | 2/2006 | Shoda | B62D 1/185 403/109.1 |
| 2014/0033856 | A1 * | 2/2014 | Bussit | B62D 1/16 74/492 |
| 2014/0260757 | A1 | 9/2014 | Stinebring et al. | |
| 2014/0270615 | A1 * | 9/2014 | Fisher | F16C 35/067 384/513 |

FOREIGN PATENT DOCUMENTS

| | | | |
|---|---|---|---|
| EP | 1566324 A1 | 8/2005 | |
| GB | 492968 A * | 9/1938 | B62D 3/04 |
| GB | 2459959 A | 11/2009 | |
| WO | 2008053327 A1 | 5/2008 | |

OTHER PUBLICATIONS

PCT International Search Report, Application No. PCT/GB2015/052708, dated Jan. 5, 2016.

* cited by examiner

IMPROVEMENTS TO STEERING COLUMN ASSEMBLIES

CROSS-REFERENCE TO RELATED APPLICATIONS

This application is a national stage of International Application No. PCT/GB2015/052708, filed 18 Sep. 2015, the disclosures of which are incorporated herein by reference in entirety, and which claimed priority to Great Britain Patent Application No. 1416575.7 filed 19 Sep. 2014, the disclosures of which are incorporated herein by reference in entirety.

BACKGROUND OF THE INVENTION

This invention relates to an improved steering column assembly.

There are many applications in which it is desirable for a steering column apparatus to be telescopic so that the length of the steering column can be adjusted. By allowing part of the shaft or shroud to move telescopically over another, the steering assembly can be adjusted for reach. In a crash, where a driver impacts the steering wheel, this can also allow the wheel to move and by controlling the rate at which the telescopic movement occurs, it is possible to absorb the energy in the crash in a controlled manner.

In a typical arrangement the steering column includes a telescopic shroud having an upper and a lower tubular shroud portion. There is typically a slit in the top surface of the upper tube which extends along a large portion (usually more than half) of its length and which enables the upper tubular portion to be squeezed into firm contact with the lower tubular portion by means of a driver-operated clamping mechanism which is assembled around a so-called adjustment clamp bolt. The clamp bolt is typically able to slide in a generally vertical direction in slots in a vehicle mounted so-called Rake Bracket in order to make the steering wheel adjustable for height. The steering wheel actually adjusts in an arc centred around a Pivot Axis which is usually designed as part of the lower mounting means where an optional Electric Power Steering (EPS) unit mounts to the vehicle at the lower end of the overall Column and EPS assembly. The Clamp Bolt also passes through generally horizontal slots in the clamp brackets which form an upper part of the upper tube in order to allow the steering wheel to be adjusted for Reach.

Where an electric power steering unit is incorporated into the column, in a common arrangement the upper tube, by which we mean the one nearest the steering wheel, is the outer tube with the lower tube slidably located within the upper tube. In such an arrangement it is conventional to support the upper column shaft by one ball bearing assembly located at the upper end of the upper column tube and also lower down via a splined sliding interface with lower shaft portion that forms the Input Shaft of the EPS unit. The EPS Input Shaft is typically cantilevered from two closely spaced bearings within the gearbox of an EPS unit. The resistance to bending of the pair of shafts, i.e. the Upper Column Shaft and the EPS Input Shaft critically depends on the bending stiffness of the said sliding interface which, because it must slide freely to allow the upper column to telescope, must possess some, albeit small, clearances. This method of supporting the Upper Column Shaft, while economical, makes it difficult to achieve the minimum natural vibration frequency target (typically 50 Hz) which vehicle manufacturers usual impose. Historically, this target has been aimed at minimizing steering wheel shake due to engine vibrations or road roughness. More recently, some vehicle manufacturers have been specifying still higher targets to avoid steering wheel shake during the operation of automatic engine stop-start fuel saving strategies.

BRIEF SUMMARY OF THE INVENTION

It is a feature of the present invention to improve the performance of a steering column assembly such as the kind described above.

According to a first aspect, the invention provides a telescopic steering column assembly comprising an upper shroud portion, a lower shroud portion, the two shroud portions being able to move relatively along a common linear path during telescopic adjustment, a telescopic steering shaft that passes through the upper and lower shroud portions and is supported by the shroud portions through at least one support bearing assembly that acts between an upper portion of the telescopic steering shaft and a lower portion of the shroud that move relative to one another axially during telescopic adjustment of the steering assembly for reach, the support bearing assembly in use removing free play between the shaft and the shroud portions that would otherwise occur in at least one direction orthogonal to the telescopic movement, in which the at least one support bearing assembly comprises:

an inner bearing race which is located on the shaft,
an outer bearing race that is located on an inner face of the shroud, and
a set of ball bearings that are located between the inner bearing race and the outer bearing race and are free to roll along bearing surfaces defined by the bearing races,
characterised in that:
each of the inner bearing race and the outer bearing races comprise a pair of annular bearing race parts, each part defining a circumferentially extending bearing face of the respective bearing race, the two parts of each pair being arranged coaxially and spaced apart from each other axially such that varying the spacing between the two parts varies the effective radius of the bearing race,
the support bearing assembly further comprising:
an inner annular support sleeve that is located between the inner bearing race and the inner shaft,
an outer annular support sleeve that is located between the outer bearing race and the shroud, and
a biasing means that in use applies an axially directed thrust between a first one of the annular support sleeves and one of the respective bearing race parts, and
in which the bearing assembly is arranged such that the axial thrust applied by the biasing means is converted into a radial thrust that is applied to the inner bearing race and outer bearing race to force them into engagement with the inner and outer sleeves respectively.

In a preferred arrangement one or both of the inner and outer sleeves may be free to expand radially under the thrust applied by the associated bearing race so that the radial thrust ensures that there are no unwanted radial clearances between the bearing assembly and both of the shaft and the shroud.

The applicant has appreciated that an apparatus of the invention may be arranged such that the radial preload applied by the biasing means generates sufficiently rigid radial contact between the bearing and the shaft or shroud (or both) to significantly reduce any steering assembly movement due to vibration, yet the associated axial friction can be readily overcome by a driver during adjustment of the assembly for reach. This will be set by the biasing means strength, the angles of the various mating faces between the bearing race parts, ball bearings and biasing means, and the coefficient of friction and area of the contact between the outer sleeve and the bore of the shroud.

One of the sleeves of the bearing assembly may include an axially spaced radially extending flange, the biasing means acting between the flange and the first one of the bearing race parts so as to push the first bearing race part towards the other bearing race part of that bearing race.

The other bearing race part may be prevented from moving away from the first bearing race by a second flange formed on the sleeve. Alternatively, it may be secured to the sleeve by some other means, such as a screw thread, a circlip or perhaps may be integrally formed with the sleeve. This second part may be considered to be a (axially) fixed part, with the first part a moving part because it can move relative to the other part.

Each bearing surface carried by one of the bearing race parts may comprise a part of a groove along which the ball bearings can roll and or slide. The two bearing surfaces of a bearing race may be inclined relative to one another by an angle of between about 30 degrees and 150 degrees. Each ball in theory will contact each surface at only a single point, the points of contact of all the balls lying on a circular path that extends around the bearing race.

In pushing one bearing race part towards the other, any axial play between the bearing race parts and the ball bearings is removed. This action will tend to cause the radius of the path along which the ball bearings contact the surfaces of the bearing race to change (moving the bearing race parts together will increase the effective radius if the biasing means acts on the inner race for example) and this change in radius will tend to cause the ball bearings to apply a radially directed thrust onto the other bearing race.

It is preferred that the biasing means acts between the inner sleeve and the inner bearing race, in which case the inner sleeve may be provided with the flange that extends radially outward from the shaft. In this case, the thrust of the biasing means will try to increase the radius of the inner bearing race (by which we mean the radius of the annular path around which the bearings will roll). It may, alternatively act between the outer race part and the outer sleeve.

The biasing means may conveniently comprise a wavy washer that is located between the sleeve (for instance a flange on the sleeve) and the first one of the bearing race parts.

The wavy washer spring will contact the bearing part at a number of circumferentially spaced locations around the washer and the flange at other circumferentially spaced locations there between.

The wavy washer spring preferably comprises a metal disk with a central hole through which the inner sleeve passes, the metal disk being deformed out of a single plane by varying amounts around its circumference, hence the "wave".

In use the biasing means may be under slight compression so that an axial thrust is applied to the bearing part that is reacted by the sleeve.

The biasing means, for example a "Wavy Washer" compression spring may apply axial forces, via a circumferentially split Thrust Ring, to the first one of the race parts against which the balls have rolling contact, the thrust ring applying a radial load to the bearing at the same time as the axial thrust so as to support the bearing race part radially.

To allow the spacing between the two race parts to be controlled, the bearing Race part that is free to move axially must be a clearance fit over the associated Sleeve to ensure that it can slide, irrespective of tolerance variations in the parts. However, if the race is not radially supported somehow, this clearance will negate the effectiveness of the bearing assembly. The Trust Ring (split) therefore supports the Inner Race—Moving via its angled face, effectively removing the said clearance.

Where the biasing means acts between the inner sleeve and the inner bearing race part, the outer sleeve associated with the outer bearing assembly may include a split at one position on its circumference so that the effective inner radius of the sleeve can expand or contract slightly in use. The sleeve will therefore not be a continuous ring.

In an alternative to a split, a part of the outer sleeve may be made resilient so that it allows the sleeve to expand radially.

In an alternative, where the biasing means acts between the outer sleeve and the outer bearing race part, the inner sleeve associated with the inner bearing assembly may include a split at one position on its circumference so that the effective outer radius of the sleeve can expand or contract slightly in use.

The outer bearing race parts may engage flanges which are formed on the outer sleeve, the flanges being inclined such that movement of the bearing parts of the outer bearing race away from one another will apply a force onto the inclined faces that causes the effective inner radius of the outer sleeve to expand.

The outer sleeve may, for example, be substantially U-shaped or V-shaped in cross section with the bearing race parts being nestled within the U-shape or V-shape.

Thus, when the inner race parts are pressed together by the biasing means, the ball bearings will move radially outward, which will cause the bearing race parts of the outer race to move axially apart, and in turn to cause the effective radius of the outer sleeve to increase until there is zero clearance between the outer sleeve and the bore of the shroud.

The effect of the spring is the urge the balls outwards towards the two solid Outer Races against which the balls also have rolling contact. These Outer Races are, in turn, thereby urged apart but are restrained from separating (axially) via contact with the angled flanges of the Outer Sleeve. The sleeve, being split, is urged to expand until it is in firm radial contact with the Lower Column Tube. Hence there is always a rigid radial load path between the shaft and the tube. The Inner Ring—Fixed is an interference fit with the Inner Sleeve. The Inner Sleeve is an interference fit with the Upper Column Shaft.

It is most preferred that the inner sleeve is secured to the shaft so that it cannot move axially whilst the outer sleeve is free to slide along the bore of the shroud. This allows the bearing to always remain at the same position on the shaft, ideally as close to the free end as possible. Of course, in an alternative the outer race part may be fixed in place and the inner sleeve may be free to slide along the shaft.

The inner sleeve may be located towards the end of the upper portion of a telescopic steering shaft of the kind in which an upper portion fits telescopically around an end of a lower portion of the steering shaft.

The bearing assembly may include a ball cage that helps retain the ball bearings in position.

The bearing race parts may comprise annular rings that are circumferentially continuous. One of the bearing parts of each bearing race may be integrally formed with the respective sleeve, or both bearing parts of each bearing race may be separate from the respective sleeve.

Other advantages of this invention will become apparent to those skilled in the art from the following detailed description of the preferred embodiments, when read in light of the accompanying drawings.

DETAILED DESCRIPTION OF THE INVENTION

Figure 1:
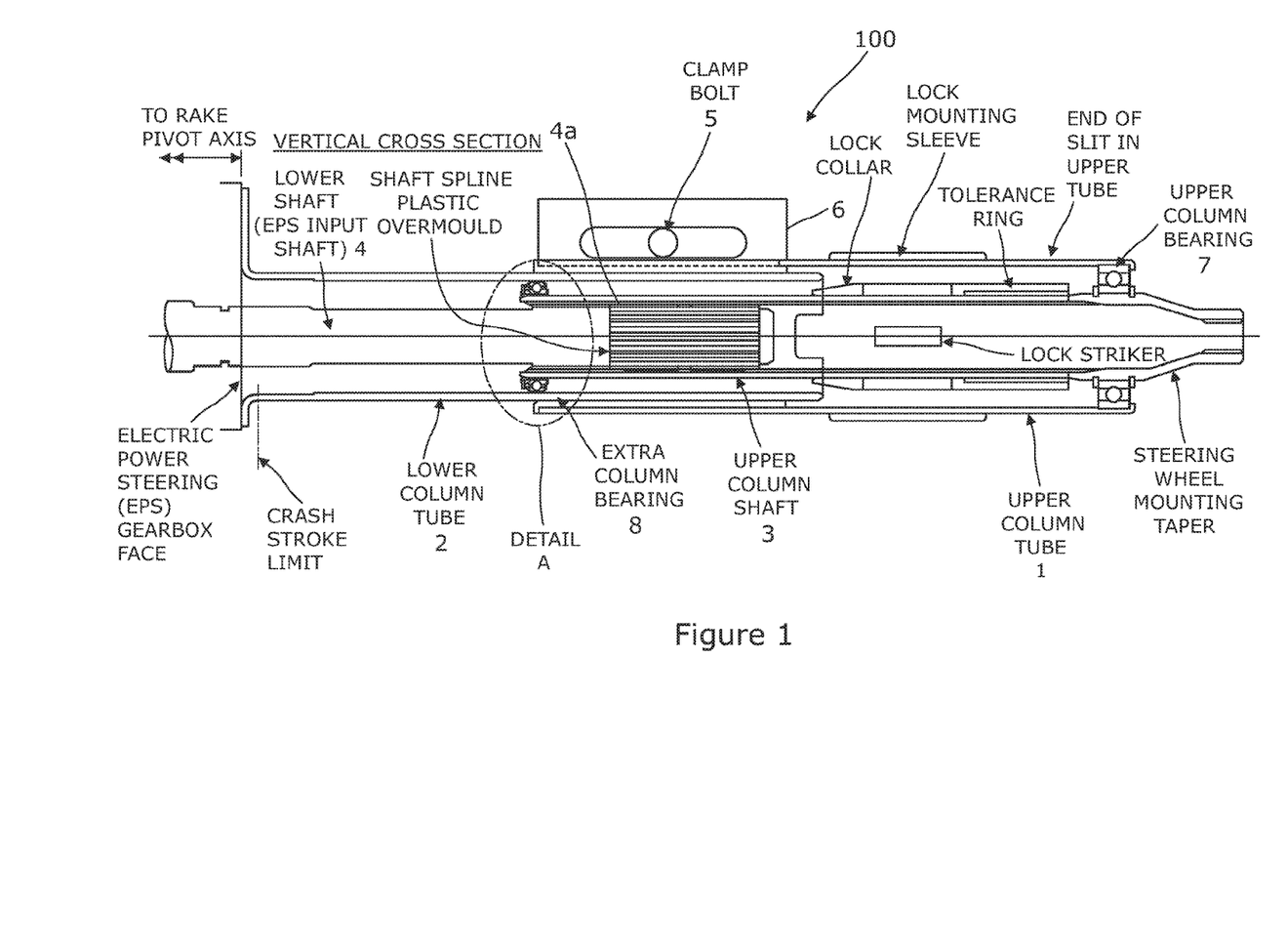
FIG. 1 is a vertical cross sectional view of a part of an embodiment of a steering column assembly of the present invention.

FIG. 1 provides a view of a steering column assembly which includes a telescopic arrangement within the scope of one aspect on the present invention. The steering column assembly 100 comprises a shroud 1, 2 which comprises a tubular upper shroud portion 1 and a tubular lower shroud portion 2, each of which comprises a cylindrical tube. The shroud portions 1, 2 are moveable relative to each other with the end of the upper shroud portion 1 being a sliding fit within an end of the lower shroud portion 2. The shroud 1, 2 surrounds a telescopic steering column shaft 3, 4. The shaft comprises an upper shaft portion 3 that at least partially surrounds a lower shaft portion 4, the two portions being connected through complimentary axially extending splines 4a. The opposite end of the upper shaft is tapered so that it can be secured to a steering wheel (not shown). The lower shaft portion 4 is connected to an optional electric power steering gearbox which in turn connects to the road wheels of the vehicle.

The upper shaft fits over the lower shaft and the upper shaft portion 3 moves whilst the lower shaft portion 4 does not move axially. Similarly, the upper, outer, shroud portion 1 is located towards the steering wheel and slides over the lower, inner, shroud portion 2. The lower shroud portion 2 is axially fixed to a gearbox (not shown). The tubular upper shroud portion 1 may be secured to a fixed part of the vehicle using a clamp mechanism (of which only a clamp bolt 5 is shown) that clamps onto a rail 6 on the upper shroud portion 1. A slit is provided in the outer shroud that is closed up as the clamp assembly is closed to cause the outer shroud portion 1 to grip the inner shroud portion 2.

An upper column bearing assembly 7 is located between the upper shaft 3 and the inner surface of the upper shroud portion 1. This snugly fills the space and ensures that the shaft 3 is located securely within the shroud 1.

An extra column bearing assembly 8 is provided between the inner shroud portion and the upper shaft 3, in the region where they overlap, providing support for the shaft 3, 4 close to the joint between the two shaft portions. In use the extra support bearing assembly 8 removes the free play that would other exist and this increases the minimum resonant natural frequency of the whole assembly compared with the same assembly without the support bearing assembly 8. This can provide a welcome improvement in the levels of NVH (noise, vibration and harshness) perceived by a user when the vehicle is travelling along a rough surface. The outer shroud portion 2, support bearing assembly 7 and shaft 3, 4 together form a telescopic assembly within the scope of the first aspect of the invention.

To allow the length of the shroud to be adjusted, the inner shroud must be free to move axially relative to the outer shroud. To this end, the support bearing assembly 8 is fixed axially only to the outer surface of the shaft 3 and is able to slide axially relative to the inner surface of the lower shroud portion 2.

Figure 2:
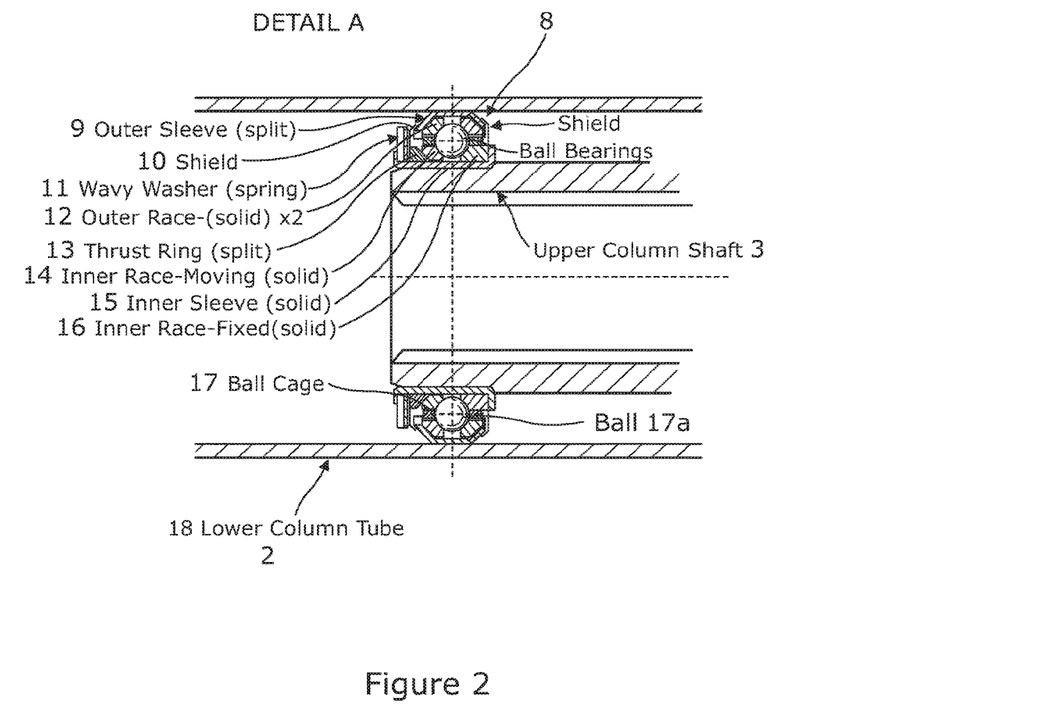
FIG. 2 is cross section view of a part of the steering column assembly that is circled as Detail A in FIG. 1, including the support bearing assembly that sits between the inner and outer shrouds along with a view of the adjacent part of the shrouds.
Figure 3:
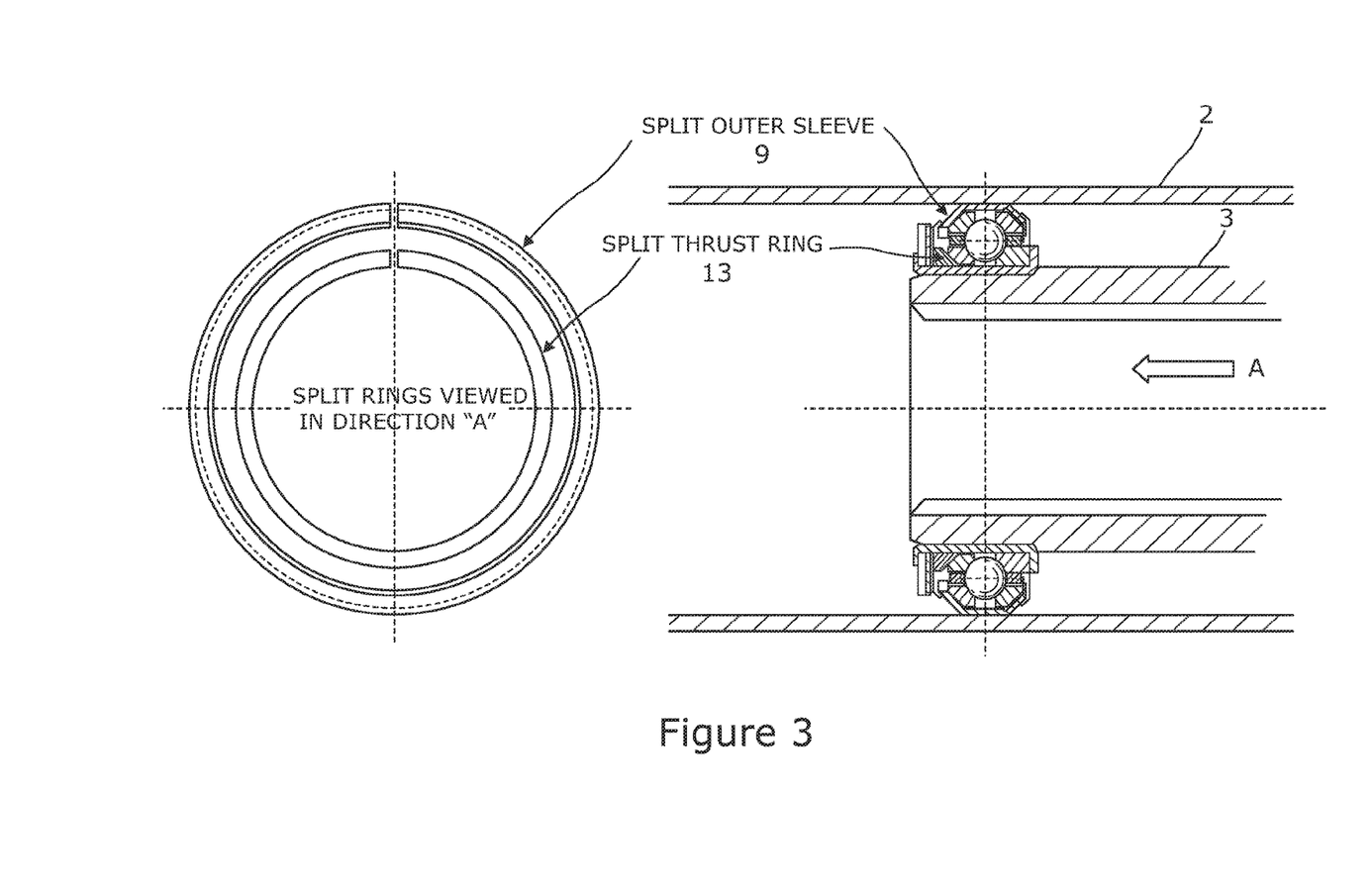
FIG. 3 includes a view of the two split annular parts of the bearing assembly of FIG. 2 in the direction of arrow A marked in FIG. 3.

The support bearing assembly 8 is shown in more detail in FIG. 2 and FIG. 3 of the drawings.

The bearing assembly 8 comprises an inner bearing race sleeve 15 that is an interference fit onto the end of the upper shaft 3. It may be an integral part of the shaft in some arrangements, but is preferably a solid ring that is pressed onto the shaft.

The sleeve 15 supports two inner bearing race parts 14, 16, and these are both prevented from sliding off the sleeve 15 by upturned circumferentially extending flanges at the ends of the sleeve 15. The two bearing race parts 14, 16 comprise annular rings that are spaced apart axially with each carrying a circumferentially extending bearing surface along which ball bearings run.

Between one of the bearing race parts 14 and an adjacent flange is a wavy washer spring 11, and this acts between the flange and the bearing race part 14 through a thrust washer 13 in this example. This allows the inner race part to be a loose fit on the sleeve, with the thrust bearing becoming wedged into the resulting gap between the bearing part and sleeve to prevent any radial free play in the inner race part. The thrust bearing as shown has an inclined face that engages a complimentary inclined face formed by the inner face of the bearing race part.

The two bearing surfaces of the inner race parts 14, 16 form a track which supports a set of ball bearings 17 in a ball cage. The effective radius of this track of ball bearings 17 is dependent upon the axial spacing between the bearing race parts. If they move slightly closer together, the radius increases. If they move slightly apart the radius decreases.

The bearing assembly 8 also comprises an outer sleeve 9 that comprises a split ring that is slid into the bore of the lower shroud part 2. This has a U-shaped cross section defining a well within which two upper bearing race parts 12 are located. These parts are spaced axially apart, in a similar manner to the inner race parts 14, 16, and each defines a bearing surface on which the ball bearings sit.

In use the thrust of the wavy washer 11 applies an axial force to the lower bearing race part 14 that is closest to it, pushing it towards the other bearing race part. That one cannot move axially, so the thrust is passed to the ball bearings 17a restrained in cage 17 as a radial thrust. This radial thrust causes the ball bearings to try to move outwards radially, which in turn causes them to apply an axial thrust to each upper bearing race part 12 to try to move them apart. This is then reacted by the sides of the outer sleeve 9 which will try to expand until this is in turn reacted by the inside wall of the lower shroud.

The bearing assembly of the embodiment is therefore arranged so that all internal and external radial clearances are maintained at zero under small radial loads, regardless of where the dimensions of the various parts involved lie within their respective tolerance bands. Importantly, the sum of the radial contact forces occurring between the bearings's Outer Sleeve and the bore of the Lower Column Tube are controlled at a magnitude such that the sliding friction of the bearing in the tube (without external loads acting on the shaft) is maintained at or close to a chosen level. To achieve this, the Outer Sleeve is split at one position on its circumference so that is can expand or contract slightly to accommodate small variations in the bore diameter of the Lower Column Tube.

Before being installed in the column, the inner and outer bearing races and ball bearings may pre-assembled around the Inner Sleeve whose end flanges enable the "Wavy Washer" compression spring to apply axial forces, via the split Thrust Ring, to the two solid Inner Race rings against which the balls have rolling contact. The effect of the spring is the urge the balls outwards towards the two solid Outer Races against which the balls also have rolling contact. These Outer Races are, in turn, thereby urged apart but are restrained from separating (axially) via contact with the angled flanges of the Outer Sleeve. The sleeve, being split, is urged to expand until it is in firm radial contact with the Lower Column Tube. Hence there is always a rigid radial load path between the shaft and the tube. The Inner Ring—Fixed is an interference fit with the Inner Sleeve. The Inner Sleeve is an interference fit with the Upper Column Shaft.

Were there no friction between the various faces of the components which are urged into contact by the spring, then the bearing would act as an elastic device whose radial spring rate would be directly proportional to the linear rate of the spring. This would result in a less than desired improvement in minimum natural frequency of the steering wheel. Fortunately, there is some sliding friction at each of the said contacting faces between the parts and all of these must slide simultaneously for the shaft to displace relative to the tube. This friction ensures that there is a threshold below which a radial force acting of the shaft will not promote a displacement. By selecting suitable values for the angles (relative to the column axis) of the various faces of the components which are urged into contact by the spring, it can be arranged that the magnitude of the said radial force threshold is well in excess of that which would be encountered in a steering wheel natural frequency test or in circumstances which are likely to excite the natural vibration modes of the steering wheel. In effect, for small radial disturbances in any direction, the shaft behaves as though it is rigidly connected to the Lower Column Tube.

Figure 4:
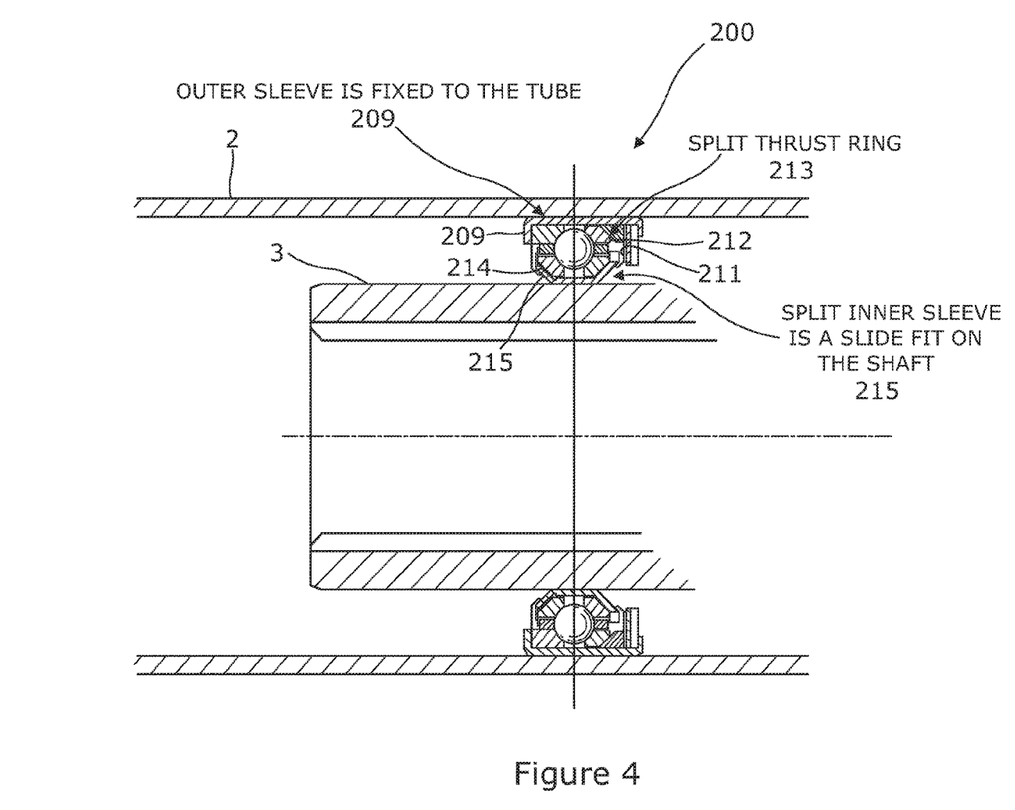
FIG. 4 is a view corresponding to that of FIG. 2 but for a second embodiment that falls within the scope of the present invention.

In an alternative arrangement of a steering column assembly 200, a detail of which is shown in FIG. 4, the bearing may be arranged so that the inner sleeve is free to slide along the shaft and the outer sleeve is fixed. In this arrangement, the order of the various parts of the bearing assembly is simply reversed so that the wavy washer biasing means acts between an outer sleeve that is fixed to the shroud, and one of the outer bearing race parts that can slide axially along the outer sleeve. The inner sleeve has the U-shape or V-shaped cross section that retains the inner race parts in a similar manner to the outer sleeve of the first embodiment. The radial thrust acts upon the inner sleeve, which is split circumferentially to allow its effective radius to be varied causing it to be pressed onto the shaft.

Note that in the embodiment of FIG. 4, the same referenced numerals used for the first embodiment have been used but increased by 200, so 15 becomes 215.

The invention therefore takes advantage of the fact that the radial disturbance forces which arise within the column at the vibration frequencies of concern are quite small. When larger, quasi-static, radial forces are applied, such as a driver leaning heavily on the rim of the steering wheel, small clearances may be temporarily permitted to arise in certain locations within the bearing but, realistically, these do not lead to unwanted vibrations. By avoiding the use of a very large said radial preload, the contact forces between the bearing and the bore of the lower tube are kept at a moderate level. Therefore the frictional resistance to the bearing assembly sliding inside the lower tube is also kept fairly low so that the increases in the Reach adjustment effort and Crash collapse force are acceptable. It is possible to manufacture the bore of the Lower Column Tube sufficiently smooth and accurate using economic tube-forming methods and without recourse to additional machining.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A telescopic steering column assembly comprising an upper shroud portion, a lower shroud portion, the two shroud portions being able to move relatively along a common linear path during telescopic adjustment, a telescopic steering shaft that passes through the upper and lower shroud portions and is supported by the shroud portions through at least one support bearing assembly that acts between an upper portion of the telescopic steering shaft and a lower portion of the shroud that move relative to one another axially during telescopic adjustment of the steering assembly for reach, the support bearing assembly in use removing free play between the shaft and the shroud portions that would otherwise occur in at least one direction orthogonal to the telescopic movement, in which the at least one support bearing assembly comprises:
an inner bearing race which is located on the shaft,
an outer bearing race that is located on an inner face of the shroud, and
a set of ball bearings that are located between the inner bearing race and the outer bearing race and are free to roll along bearing surfaces defined by the bearing races, wherein:
each of the inner bearing race and the outer bearing races comprise a pair of annular bearing race parts, each part defining a circumferentially extending bearing surface of the respective bearing race, the two parts of each pair being arranged coaxially and spaced apart from each other axially such that varying the spacing between the two parts varies the effective radius of the bearing race, the support bearing assembly further comprising:
an inner annular support sleeve that is located between the inner bearing race and the inner shaft,
an outer annular support sleeve that is located between the outer bearing race and the shroud, and
a biasing means that in use applies an axially directed thrust between a first one of the annular support sleeves and one of the respective bearing race parts, and
in which the bearing assembly is arranged such that the axial thrust applied by the biasing means is converted into a radial thrust that is applied to the inner bearing race and outer bearing race to force them into engagement with the inner and outer sleeves respectively.

2. The telescopic steering assembly according to claim 1 in which one or both of the inner and outer sleeves may be free to expand radially under the thrust applied by the associated bearing race so that the radial thrust ensures that there are no unwanted radial clearances between the bearing assembly and both of the shaft and the shroud.

3. The telescopic steering assembly according to claim 1 in which one of the sleeves of the bearing assembly includes an axially spaced radially extending flange, the biasing means acting between the flange and the first one of the bearing race parts so as to push the first bearing race part towards the other bearing race part of that bearing race.

4. The telescopic steering assembly according to claim 3 in which the other bearing race part is prevented from moving away from the first bearing race by being secured to the sleeve.

5. The telescopic steering assembly according to claim 1 where the biasing means comprises a wavy washer that is located between the sleeve and the first one of the bearing race parts and which contacts the bearing part at a number of circumferentially spaced locations around the washer and the flange at other circumferentially spaced locations there between.

6. The telescopic steering assembly according to claim 1 in which the biasing means applies an axial force, via a circumferentially split thrust ring, to the first one of the race parts against which the balls have rolling contact, the thrust ring applying a radial load to the bearing at the same time as the axial thrust so as to support the bearing race part radially.

7. The telescopic steering assembly according to claim 1 in which the biasing means acts between the inner sleeve and the inner bearing race.

8. The telescopic steering assembly according to claim 7 in which the outer sleeve associated with the outer bearing assembly includes a split at one position on a circumference thereof so that the effective inner radius of the sleeve can expand or contract slightly in use.

9. The telescopic steering assembly according to claim 7 in which the outer bearing race parts engage flanges which are formed on the outer sleeve, the flanges being inclined such that movement of the bearing parts of the outer bearing race away from one another will apply a force onto the inclined faces that causes the effective inner radius of the outer sleeve to expand.

10. The telescopic steering assembly according to claim 9 in which the outer sleeve is substantially U-shaped or V-shaped in cross section with the bearing race parts being nestled within the flanges defined by the U-shape or V-shape.

11. The telescopic steering assembly according to claim 1 in which the inner sleeve is secured to the shaft so that it cannot move axially whilst the outer sleeve is free to slide along the bore of the shroud.

12. The telescopic steering assembly according to claim 1 in which the inner sleeve is located towards the end of the upper portion of a telescopic steering shaft and in which the end of an upper portion fits telescopically around an end of a lower portion of the steering shaft.

\* \* \* \* \*